US007832071B2

(12) United States Patent
Klann

(10) Patent No.: US 7,832,071 B2
(45) Date of Patent: Nov. 16, 2010

(54) DEVICE FOR EXTRACTING A NOZZLE ASSEMBLY

(75) Inventor: Horst Klann, Villingen-Schwenningen (DE)

(73) Assignee: Klann Spezial-Werkzeugbau GmbH, Donaueschingen (DE)

( * ) Notice: Subject to any disclaimer, the term of this patent is extended or adjusted under 35 U.S.C. 154(b) by 1050 days.

(21) Appl. No.: 11/143,365

(22) Filed: Jun. 2, 2005

(65) Prior Publication Data

US 2005/0278917 A1 Dec. 22, 2005

(30) Foreign Application Priority Data

Jun. 21, 2004 (DE) .................. 20 2004 009 755 U

(51) Int. Cl.
*B23P 19/06* (2006.01)

(52) U.S. Cl. .......................................... 29/214; 29/263

(58) Field of Classification Search .................. 29/263, 29/264

See application file for complete search history.

(56) References Cited

U.S. PATENT DOCUMENTS

| | | | | |
|---|---|---|---|---|
| 2,475,040 | A * | 7/1949 | Mandl | 29/252 |
| 2,883,741 | A | 4/1959 | Yerkes | |
| 3,408,724 | A * | 11/1968 | Hoeijenbos | 29/263 |
| 4,476,617 | A * | 10/1984 | Kobylarz | 29/264 |
| 6,092,279 | A * | 7/2000 | Shoup | 29/264 |
| 6,990,713 | B2 * | 1/2006 | Tally et al. | 29/264 |
| 2005/0278917 | A1 * | 12/2005 | Klann | 29/214 |

FOREIGN PATENT DOCUMENTS

| | | |
|---|---|---|
| DE | 40 38 603 C2 | 6/1992 |
| DE | 298 20 389 U1 | 1/2000 |
| WO | WO 81/02538 | 9/1981 |

* cited by examiner

*Primary Examiner*—Lee D Wilson
(74) *Attorney, Agent, or Firm*—McGlew and Tuttle, P.C.

(57) ABSTRACT

A device for extracting a nozzle assembly of a fuel injection installation. The nozzle assembly is pressed into a cylinder head of an internal combustion engine, with a support pipe, with which the extraction device of the device is supported in the area surrounding the nozzle assembly on the valve cover during the extraction operation. To rule out deformations of the valve cover in case of strong tensile forces and extremely crowded space conditions, provisions are made according to the present invention for a divided support ring, which is formed from two ring sections, which can be placed individually on the valve cover in the area surrounding the nozzle assembly, to be able to be inserted between the support pipe of the extraction device and the surface of the valve cover.

9 Claims, 5 Drawing Sheets

DEVICE FOR EXTRACTING A NOZZLE ASSEMBLY

CROSS REFERENCE TO RELATED APPLICATIONS

This application claims the benefit of priority under 35 U.S.C. §119 of German Application DE 20 2004 009 755.9 filed Jun. 21, 2004, the entire contents of which are incorporated herein by reference.

FIELD OF THE INVENTION

The present invention pertains to a device for extracting a nozzle assembly of a fuel injection installation, which is pressed into a cylinder head of an internal combustion engine.

BACKGROUND OF THE INVENTION

So-called fuel injection installations are used in modern engines to supply internal combustion engines with fuel. They are used regardless of whether the engine is a so-called gasoline engine or a diesel engine. Constructions in which a so-called nozzle assembly is inserted directly into the cylinder head are used to inject the fuel into the combustion chamber. The nozzle assembly passes through a so-called calve cover mounted on the cylinder head and is pressed, for example, into a mounting hole of the cylinder head. The nozzle assembly has an approximately cylindrically shaped mounting section for this purpose. At its end directed toward the combustion chamber, this nozzle assembly is provided with the injection nozzle proper. At its opposite end protruding from the cylinder head, the nozzle assembly has a radially expanded head part, which is provided with a connection pipe for the fuel supply, on the one hand, and with a connector plug for actuating a control valve arranged in an integrated manner in the head part, on the other hand.

To secure the nozzle assembly in the mounting hole of the cylinder head, the mounting shaft of the nozzle assembly has, directly below its head part, two lateral milled-out recesses, which form a stop face towards the head part, on the one hand, and another pair of stop faces toward the injection nozzle, on the other hand. These milled-out recesses form two sides extending in parallel to one another and in parallel to the central longitudinal axis of the nozzle assembly. To secure the nozzle assembly in the hole of the cylinder head, a fork-shaped clamping claw each is provided, which engages with its fork legs the milled-out recesses of the mounting shaft and holds the nozzle assembly tightly in the hole of the cylinder head via the stop faces of the milled-out recesses, which said stop faces are directed toward the injection nozzle. The clamping claw is fastened to the cylinder head by means of a mounting screw.

Furthermore, in the area of its end area located opposite the two fork legs, the clamping claw has a support lever, which is provided with a depression. With this depression of the support lever, the clamping claw is supported on a pressing ball, which is arranged in the valve cover of the cylinder head and partially projects from the valve cover of the cylinder head vertically in the upwardly direction. Together with the support lever of the clamping claw, this pressing ball forms a type of pivoted mount of the clamping claw, so that the latter secures the nozzle assembly in the hole of the cylinder head with its fork legs when the mounting screw is tightened. Furthermore, the nozzle assembly can also be pressed into the mounting hole of the cylinder head with the clamping claw because of this special mounting of the nozzle assembly via the stop faces of the milled-out recesses. Furthermore, the nozzle assembly is also fixed in its angular position by the fork legs of the clamping claw.

It was now found that it is extremely difficult to extract such a nozzle assembly from the mounting hole of the cylinder head after a longer operating time of the internal combustion engine.

Moreover, it should be noted that the valve cover extends upwardly up to the head part of the nozzle assembly in the area surrounding the head part of the nozzle assembly and it has only a short distance from the head part. There is only an extremely short distance between the valve cover and the head part of the nozzle assembly especially in the areas extending at right angles to the clamping claw.

Furthermore, the electric connector plug is screwed onto the head part and can be removed to remove the nozzle assembly from the head part. An internal thread arranged in the head part is freely accessible for attaching an extraction device after the removal of this connector plug, i.e., a type of support pipe, which is supported at the valve cover in the area surrounding the one through hole of the valve cover during the subsequent extraction operation, can be actually pushed over the head part to extract the nozzle assembly. However, because of the extremely short distance between the valve cover and the head part of the nozzle assembly, such a support pipe can be provided with an extremely small wall cross section only to be pushed into the intermediate space between the head part and the valve cover. This has, in turn, the consequence that especially in case of extremely strong tensile forces, deformation will occur due to the high surface pressure between the front surface of the support pipe and the surface of the valve cover. This high surface pressure leads to unacceptable deformations in the area surrounding the through hole of the valve cover, so that the latter may possibly have to be replaced after the extraction of the nozzle assembly.

SUMMARY OF THE INVENTION

Consequently, the basic object of the present invention is to improve a device for extracting a nozzle assembly, which device is of the above-described type, such that such deformations cannot occur.

The object is accomplished according to the present invention by inserting a divided support pipe, which is formed from two ring sections, which can be placed individually on the valve cover in the area surrounding the nozzle assembly, between the support pipe of the extraction device and the surface of the valve cover. An enlargement of the support surface for the support pipe is thus achieved, so that the above-mentioned unacceptable deformations of the surface and especially of the edge area of the through hole of the valve cover for the nozzle assembly are prevented from occurring with certainty.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
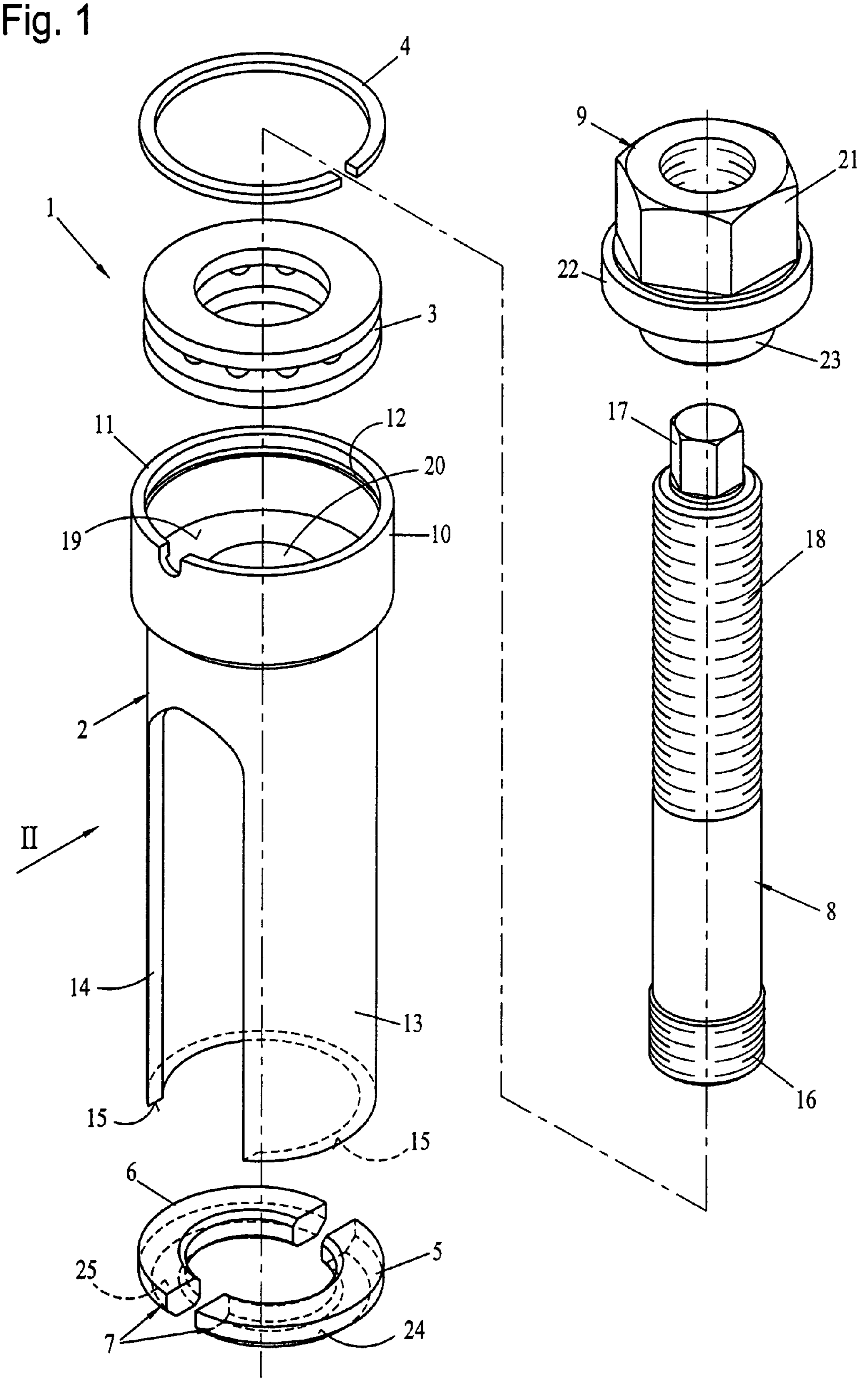
FIG. 1 is a perspective exploded view of a device according to the present invention.

Referring to the drawings in particular, FIG. 1 shows a perspective view of a device 1 according to the present invention. This device 1 comprises a support cylinder 2, a thrust bearing 3, a locking ring 4, a support ring 7 comprising two ring sections 5 and 6, as well as an extraction spindle 8 and an extraction nut 9.

At its upper end, the support cylinder 2 has a radially expanded cylinder section 10 for receiving the thrust bearing, which said cylinder section is provided with an inner mounting groove 12 in the area of its upper end edge 11. The locking ring 4 can be inserted into the mounting groove 12 to hold the thrust bearing 3 captively in the cylinder section 10 under a radial pretension.

The support wall, which extends vertically downwardly starting from the cylinder section 10, has an opening 14, which is open downwardly and with which the support cylinder 2 or the support wall 13 thereof can be pushed over a radially projecting connection pipe of a nozzle assembly, as will be explained in greater detail below. Starting from the lower front ring surface 15 of the support wall 13, which said front ring surface is interrupted by the opening 14, this opening 14 extends at least approximately to the cylinder section 10 of the support cylinder 2.

In the area of its end that is its lower end in FIG. 1, the extraction spindle 8 has a mounting thread 16, with which the extraction spindle 8 can be tightly screwed into a corresponding coupling thread of a nozzle assembly, as it will also be explained in greater detail below.

In the upper end area located opposite this mounting thread 16, the extraction spindle 8 is provided with an axially upwardly projecting hexagon 17, which is used to screw the extraction spindle 18 with its mounting thread 16 into the coupling thread of the nozzle assembly.

Starting from this hexagon 17, the extraction spindle 8 has an adjusting thread 18, which extends at least over half of its axial length and on which the extraction nut 9 can be screwed.

In the area of the cylinder section 10, the support cylinder 2 forms a circumferential, annular support surface 19 for axially supporting the thrust bearing 3. In the center of this support surface 19 the support cylinder 2 has a through hole 20, through which the extraction spindle 8 can be passed.

Figure 2:
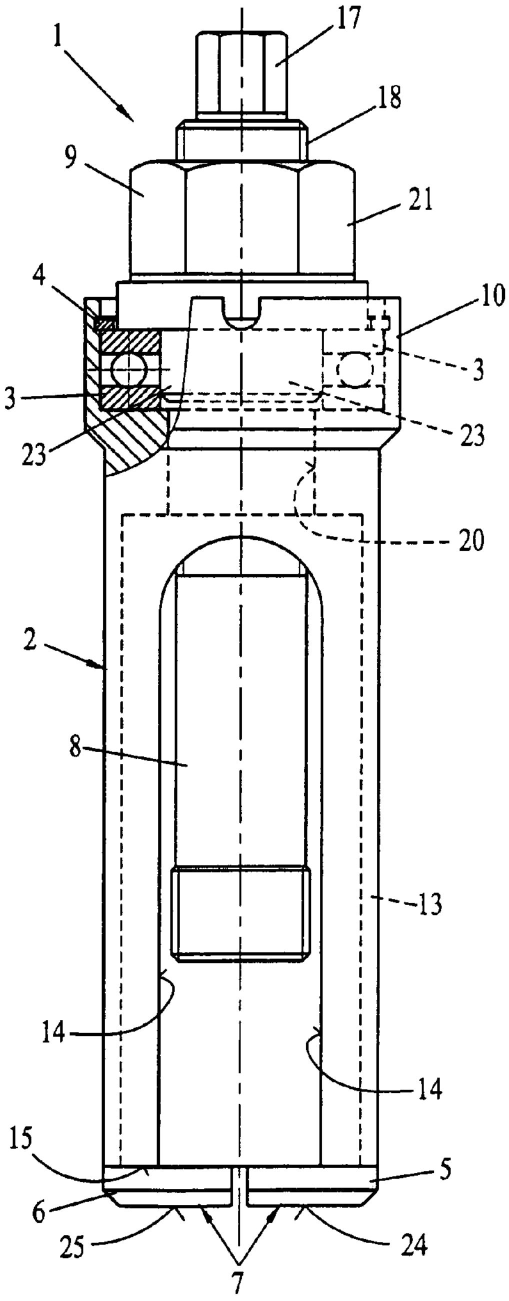
FIG. 2 is a partially sectional a front view II from FIG. 1, showing the device of FIG. 1 according to the present invention in the mounted state.

FIG. 2 shows the device 1 from FIG. 1 in the completely mounted state. It can be recognized that the extraction spindle 8 is passed through the through hole 20 and protrudes axially into the lower end area of the opening 14. The extraction nut 9 is screwed onto the adjusting thread 18 of the extraction spindle 8, and the hexagon 17 of the extraction spindle 8 is freely accessible and projects axially upwardly over the extraction nut 9. The thrust bearing 3 is inserted into the cylinder section 10 and is captively secured by the locking ring 4 in the cylinder section 10. Under its hexagon 21, the extraction nut 9 has a radially expanded support collar 22, via which the extraction nut 9 is axially supported at the thrust bearing 3. Furthermore, this support collar 22 of the extraction nut 9 is joined by a cylindrical centering section 23, with which the extraction nut 9 axially protrudes into the thrust bearing 3 and via which the extraction nut 9 is guided in the thrust bearing 3 in a centered manner.

Furthermore, it can be recognized from FIG. 2 that the support cylinder 2 with the lower front ring surface 15 of its support wall 13, which said front ring surface is interrupted by the opening 14, is supported axially on the two ring sections 5 and 6 of the divided support ring 7.

As it can also be recognized in this connection from FIG. 1, the two ring sections 5 and 6 form a lower, annular axial support surface 24 and 25, respectively, which have a markedly greater radial width than the front ring surface 15 of the support wall 13 of the support cylinder 2. Due to this radially broader support surface 24 and 25, the surface pressure between the ring sections 5 and 6 of the divided support ring 7 and a valve cover is reduced during the use of the device 1 according to the present invention, so that unacceptable deformations of this valve cover in the area of a nozzle assembly to be extracted are prevented from occurring with certainty.

Figure 3:
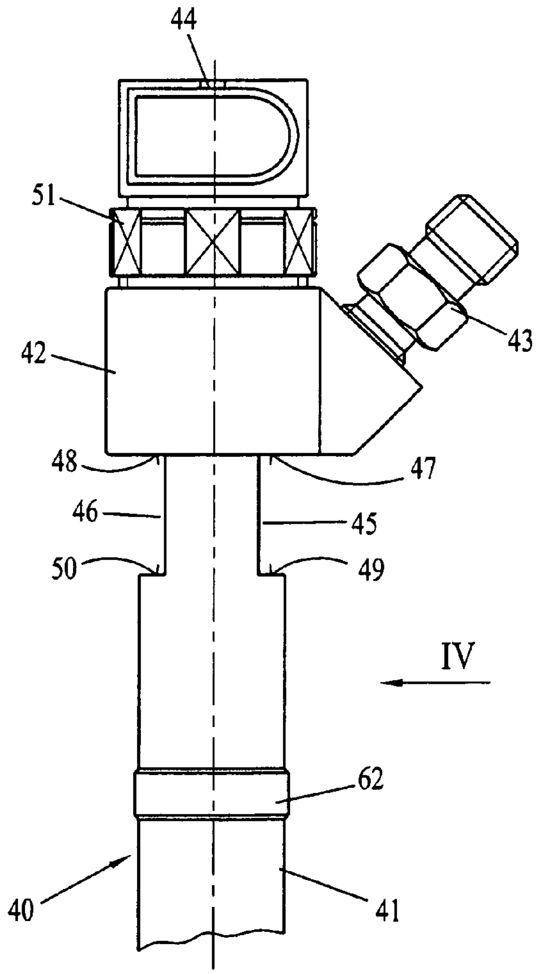
FIG. 3 is a schematic diagram of a nozzle assembly to be extracted in a side view.

The general embodiment of such a nozzle assembly 40 is shown in a side view in FIG. 3. This nozzle assembly 40, which is shown as an example, has a mounting cylinder 41, in the lower end of which, not shown in the drawing, an injection nozzle is arranged. In the upper end area, the nozzle assembly 40 is provided with a radially expanded head part 42, which has a radially projecting connection pipe 43, which is directed obliquely upwardly in this exemplary embodiment. This connection pipe 43 is used to feed fuel and is correspondingly connected to a corresponding supply line of the fuel injection installation of an internal combustion engine during operation.

A connector plug 44, which is connected during operation with corresponding electric control lines of the fuel injection installation of the internal combustion engine, is provided above the head part for controlling a control valve (not shown) arranged in the head part 42 in an integrated manner. This connector plug 44 is detachably fastened to the head part 42 by means of a coupling ring 51.

Furthermore, it is apparent from FIG. 3 that the mounting cylinder 41 is provided with two diametrically opposite milled-out recesses 45 and 46 directly under the head part 42. These milled-out recesses 45 and 46 form a stop face 47 and 48, respectively, toward the head part 42, on the one hand, and two other stop faces 49 and 50 toward the lower end of the mounting cylinder 41, on the other hand. These milled-out recesses 45 and 46 are provided to secure the nozzle assembly 40 at the cylinder head.

Figure 4:
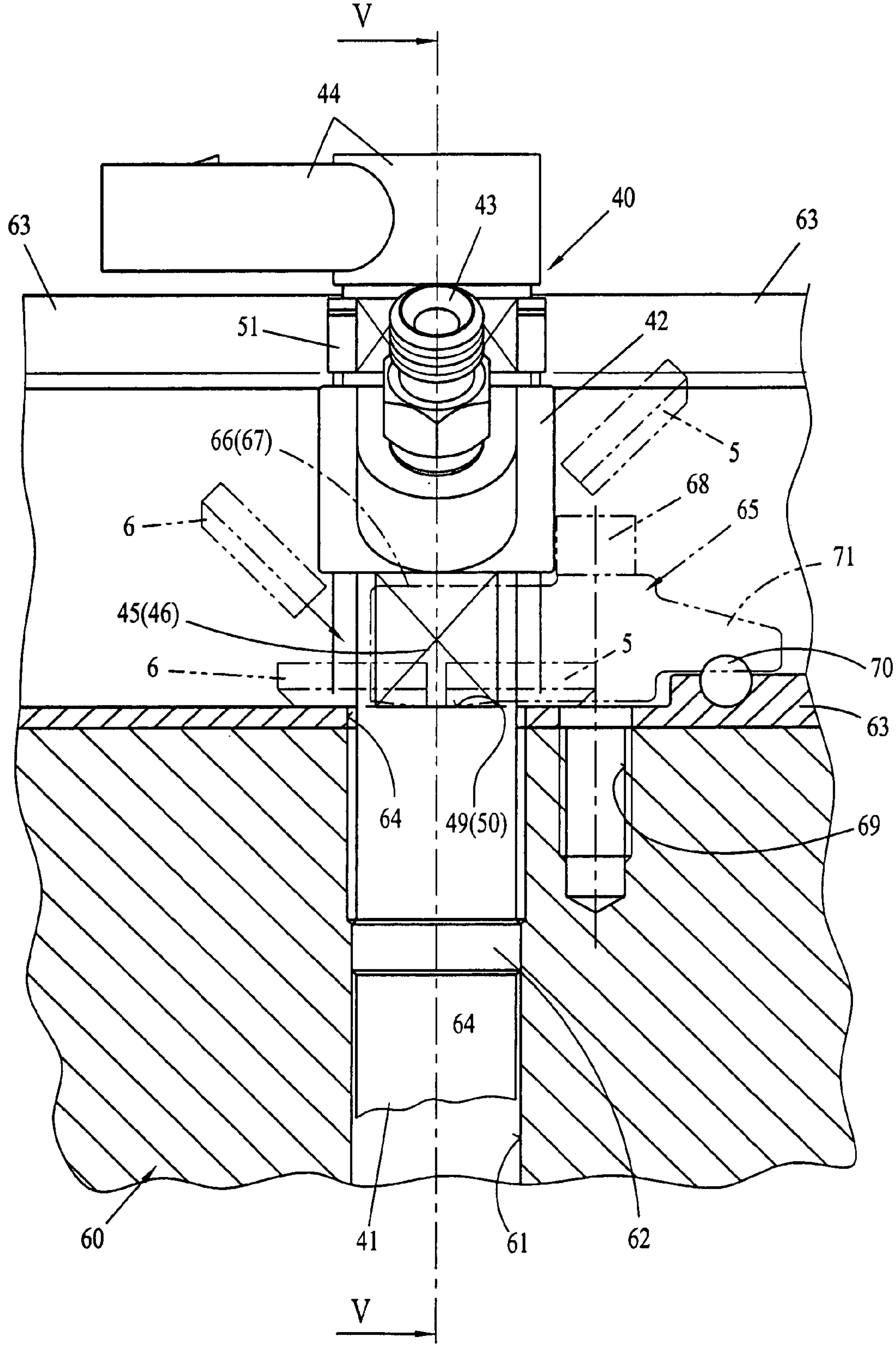
FIG. 4 is a view IV from FIG. 3 of the nozzle assembly in the state in which it is mounted in a cylinder head.

Such a mounted state of the nozzle assembly 40 in a cylinder head 60 is shown as a partial section in FIG. 4. It can be recognized that the cylinder head 60 has a mounting hole 61, into which the nozzle assembly 40 is pressed. To hold the nozzle assembly 40 tightly in the mounting hole 61 of the cylinder head 60, the mounting cylinder 41 has a radially expanded pressing collar 62, which extends over a relatively short axial length, under its two milled-out recesses.

Furthermore, a valve cover 63 is placed on the cylinder head 60, the valve cover 63 having a corresponding through hole 64 for passing through the nozzle assembly 40 with its mounting cylinder 41, the through hole 64 being arranged coaxially with the mounting hole 61 of the cylinder head 60 in the mounted state.

To secure the nozzle assembly 40 in the position shown in FIG. 4, in which it is mounted in the cylinder head 60, a clamping claw 65, indicated by phantom lines in FIG. 4, is provided. This clamping claw forms a type of clamping fork toward the nozzle assembly 40, which said clamping fork forms two fork legs 66 and 67, one of which is recognizable in FIG. 4. However, it is easy to imagine that the clamping claw 65 with its two fork legs 66 and 67 can be pushed fittingly into the milled-out recesses 45 and 46 of the nozzle assembly. Furthermore, this clamping claw 65 can be mounted snugly at the cylinder head 60 by means of a mounting screw 68. This mounting screw 68 passes now through the clamping claw 65 as well as the valve cover 63 and is screwed into a corresponding threaded hole 69 of the cylinder head 60.

To make it possible to obtain a corresponding clamping force of the two fork legs 66 and 67 on the respective stop faces 49 and 50 of the milled-out recesses 45 and 46 of the mounting cylinder 41 of the nozzle assembly 40, a pressing ball 70 is provided in the valve cover 63. This pressing ball 70 is arranged diametrically opposite the nozzle assembly 40 in relation to the mounting screw 68 and the threaded hole 69. For axial support at the pressing ball 70, the clamping claw 65 has a corresponding support lever 71, which extends radially in a direction opposite the direction of the two fork legs 66 and 67 of the clamping claw 65. It is ensured by this construction of the clamping claw 65 and by it being supported via the pressing ball 70 that the clamping claw 65 with its fork legs 66 and 67 will hold the nozzle assembly 40 in the operating position shown in FIG. 4 in the mounting hole 61 of the cylinder head 60 and also fix it in its angular position shown.

To make it now possible to extract the nozzle assembly 40 from the cylinder head 60, the mounting screw 68 as well as the clamping claw 65 are first to be removed. Furthermore, the connector plug 44 of the nozzle assembly 40 is to be removed by screwing off the coupling ring 51 from the head part 42. After removing the connector plug 44 from the head part 42, an internal thread 52 arranged in the head part 42 becomes freely accessible, as this can be recognized from FIG. 5. After the connector plug 44 has now been removed, the two ring sections 5 and 6 are placed on the valve cover 63 in the area directly surrounding the mounting cylinder 41. Due to the extremely crowded space conditions, these ring sections 5 and 6 are to be introduced laterally, obliquely from the top, under the head part 42 of the nozzle assembly 40 obliquely downwardly, as this is indicated by the phantom lines in FIG. 4.

The two ring sections 5 and 6 are subsequently brought radially into contact with the mounting cylinder 41 of the nozzle assembly 40 and placed on the valve cover 63 in the area directly surrounding the through hole 64 of the valve cover 63. The ring sections 5 and 6 thus placed on the valve cover 63 in the area directly surrounding the mounting cylinder 41 now form a contact surface that is enlarged especially in the radial direction for the device 1 to be put on subsequently with its support cylinder 2, as this can be recognized from FIG. 5.

Figure 5:
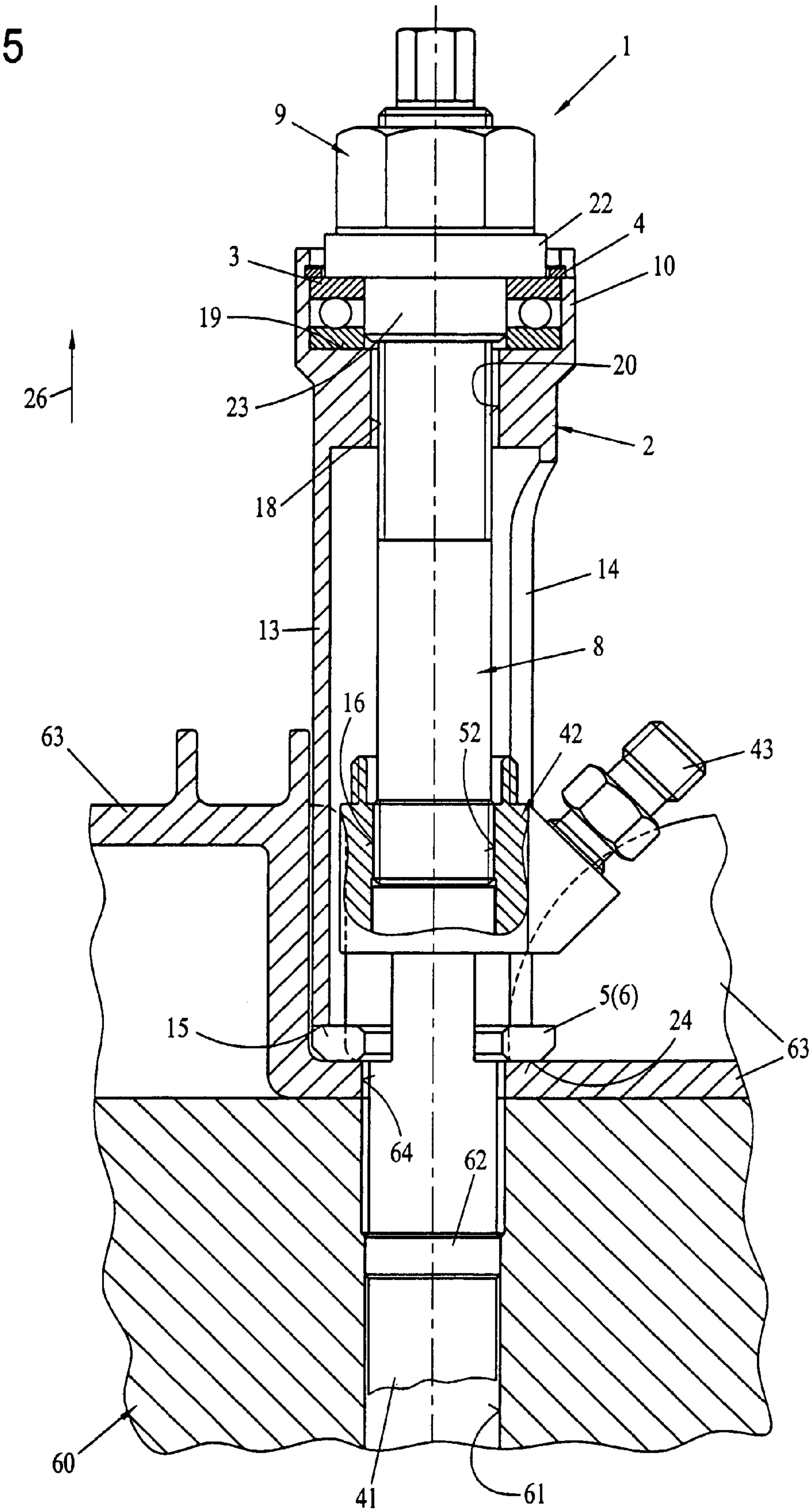
FIG. 5 is a partial sectional view V-V from FIG. 4 with the device according to the present invention in a state in which it is attached to a nozzle assembly.

FIG. 5 shows a partial section V-V from FIG. 4 with the device 1 attached. It can be recognized that the support cylinder 2 of the device 1 is flatly supported on the ring sections 5 and 6 with the lower front ring surface 15 of its support wall 13, but only the support ring 5 located behind the plane of the drawing can be recognized in FIG. 5. The support ring 5 now lies in the area directly surrounding the mounting cylinder 41 of the nozzle assembly 40 and forms with its support surface 24 an enlarged support surface for supporting the support cylinder 2 on the surface of the valve cover 63. The pressing forces acting on the valve cover 63 during the extraction operation are considerably reduced by this radially enlarged support surface, so that no deformation can occur especially in the area of the through hole 64 of the valve cover 63.

It can also be recognized from FIG. 5 that the extraction spindle 8 with its lower mounting thread 16 is screwed tightly into the coupling thread 52 of the head part 42 of the nozzle assembly 40. In this attached state of the device 1 the connection pipe 43 of the head part 42 passes through the opening 14 of the support wall 13 of the support cylinder 2. It can be recognized from FIG. 5 that this opening 14 extends approximately to the cylinder section 10 of the support cylinder 2 in the axial direction from bottom to top, so that a sufficient path of adjustment is available for the connection pipe 43 for extracting the nozzle assembly 40.

It can also be seen in FIG. 5 that the extraction nut 9 with its support collar 22 is supported in the axial direction on the thrust bearing 3 and is guided coaxially in the thrust bearing 3 via its centering section 23. The extraction nut 9 is screwed now on the adjusting thread 18 of the extraction spindle 8. It is easy to imagine that the extraction spindle 8 is pulled in the direction of arrow 26 during the tightening of the extraction nut 9 and the nozzle assembly 40 is extracted from the mounting hole 61 of the cylinder head 60 at the same time by this adjusting movement of the extraction spindle 8.

It can be recognized that because of the divided support ring 7 with its two ring sections 5 and 6, a sufficiently large two-dimensional force distribution is brought about on the valve cover 63 even in case of strong extraction forces, so that undesired deformations or even destruction of the surface of the valve cover 63, especially in the area surrounding the through hole 64 of the valve cover, are avoided. In addition, insertion is made possible in the first place by the divided design of the support ring with its two ring sections 5, 6, even under extremely crowded space conditions between the valve cover 63 and the head part 42 of the nozzle assembly 40.

Figure 6:
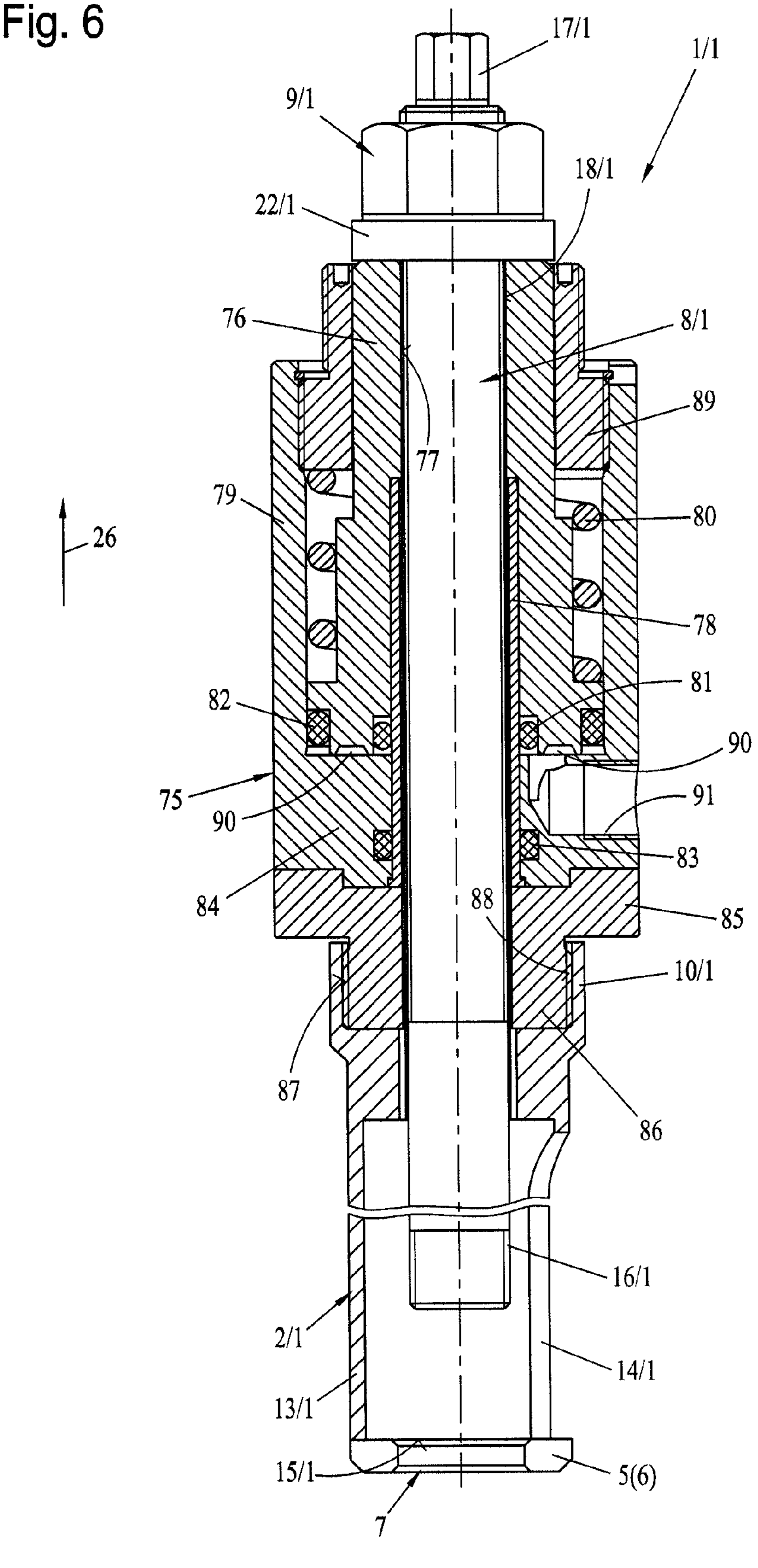
FIG. 6 is a vertical sectional view of an exemplary embodiment with a hydraulic cylinder as an extraction device.

FIG. 6 shows another exemplary embodiment of a device 1/1 according to the present invention, in which the extraction device has a hydraulic cylinder 75. The hydraulic cylinder 75 is designed as a so-called tubular piston cylinder and has a tubular piston 76, which is provided with a central through hole 77 in this exemplary embodiment. The tubular piston 76 is guided in an axially displaceable manner in its upper end area via a head part 89 screwed into the cylinder wall 79 of the hydraulic cylinder 75 from the outside. In its lower end area, the tubular piston 76 is radially expanded and is guided by the cylinder wall 79 in an axially adjustable manner. Furthermore, a guide sleeve 78, by which the pressure chamber 90 of the hydraulic cylinder 75 is limited radially inwardly, is provided in the area of the, radially expanded area of the tubular piston 76. The pressure is admitted via a connection pipe, not shown in the drawing, which can be screwed into a corresponding connection thread 91 in the area of the bottom plate 84 of the hydraulic cylinder.

The tubular piston is sealed toward the cylinder wall 79 in its expanded area by means of an O-ring 82. For sealing radially toward the inside, an additional O-ring 81 is provided between the tubular piston 76 and the guide sleeve 78 protruding into the tubular piston 76. For sealing the pressure chamber toward the outside, an O-ring 83 is likewise arranged between the guide sleeve 78 and the bottom plate 84 of the hydraulic cylinder 75. When pressure is admitted into the pressure chamber 90, the tubular piston 76 is pushed in the direction of arrow 26 and is thus moved out of the head part 89 of the hydraulic cylinder 75 toward the outside.

As can be recognized from FIG. 6, the hydraulic cylinder 75 is screwed to the support cylinder 2/1. The hydraulic cylinder 75 has a closing cover 85 for this purpose at its lower end, which said closing cover is provided with a corresponding threaded pipe 86 with external thread 87. This closing cover 85 is used at the same time to hold the guide sleeve 78 in the hydraulic cylinder 75, as this can be recognized from FIG. 6. To screw the support cylinder 2/1 on the threaded pipe 86 of the closing cover, a corresponding internal thread 88 is provided in this exemplary embodiment in the area of the upper cylinder section 10/1 of the support cylinder 2/1. The design of the support cylinder 2/1 is otherwise identical to that of the support cylinder 2 according to the exemplary embodiment shown in FIG. 5 and is likewise provided with a support wall 13/1, which forms a front ring surface 15/1 interrupted by an opening 14/1 in the circumferential direction on the underside. The support cylinder 2/1 is also supported with this front ring surface 15/1 on the surface of a valve cover via the support ring 7 consisting of the two ring segments 5 and 6, as this was already described in FIG. 4 for the exemplary embodiment according to drawing FIGS. 1 through 3.

To couple this extraction device with a nozzle assembly, as this is shown in FIG. 5, a threaded spindle 8/1, which passes completely through the entire hydraulic cylinder 75 from top to bottom, is provided as the piston rod in his exemplary embodiment. At the lower end the threaded spindle 8/1 has a mounting thread 16/1, with which the threaded spindle 8/1 can be coupled with the nozzle assembly, as this is shown in FIG. 5 for the threaded spindle 8. To rotatingly drive the threaded spindle 8/1, the latter is likewise provided with a hexagon 17/1, as this was already described in connection with the exemplary embodiment according to FIG. 5.

To couple the threaded spindle 8/1 axially with the tubular piston 76, the threaded spindle 8/1 has, in its end area located opposite the mounting thread 18/1, an adjusting thread 18/1, onto which a corresponding extraction nut 9/1 is screwed. This extraction nut is supported on the top side on the tubular piston 76 with a radially expanded support collar 22/1 during the extraction operation, so that when the tubular piston is activated and adjusted in the direction of arrow 26, the threaded spindle is pulled in the same direction.

This embodiment according to FIG. 6 is especially advantageous when a nozzle assembly is anchored extremely tightly in a cylinder head after a longer operating time.

It can also be recognized from FIG. 6 that a resetting spring 80, which is supported axially downwardly at the radially expanded section of the tubular piston 76, on the one hand, and axially upwardly at the head part 89 of the hydraulic cylinder 75 on the underside, on the other hand, is arranged in the hydraulic cylinder 75. After the tubular piston 76 has been released, the tubular piston is reset into its starting position shown in FIG. 6 by means of this resetting spring 80.

Based on the use of the tubular piston cylinder 75 with its threaded spindle 8/1, this tubular piston cylinder may also be used as an alternative to the threaded spindle 8. If the adjusting thread 18/1 of the threaded spindle 8/1 is provided with a greater length, as this can be recognized as an example from FIG. 6, this threaded spindle 8/1 can be used both in connection with the thrust bearing in the cylinder section 10 of the exemplary embodiment according to FIG. 5 and in connection with the tubular piston cylinder 85. Should there be a risk that the threaded connection between the adjusting thread 18/1 and the extraction nut 9/1 is damaged during the extraction of nozzle assemblies seated especially tightly, the tubular piston cylinder 75 may also be attached directly to the thrust bearing 3 according to the exemplary embodiment shown in FIG. 5. If the threaded spindle is provided with a greater length, it projects over the tubular piston cylinder 75, so that the extraction nut 9/1 can be screwed on. The variability of the device according to the present invention is thus increased considerably.

While specific embodiments of the invention have been shown and described in detail to illustrate the application of the principles of the invention, it will be understood that the invention may be embodied otherwise without departing from such principles.

What is claimed is:

1. A device for extracting a nozzle assembly of a fuel injection installation, the nozzle being pressed into a cylinder head of an internal combustion engine, the device comprising:

an extraction device including a support cylinder and a separate, support ring detached from said support cylinder, said support cylinder having a front ring surface located at an end thereof, said support ring having a first ring section and a second ring section to be placed on a valve cover in an area surrounding the nozzle assembly, said support ring being arranged between the support cylinder and a valve cover placed on the cylinder head, said first ring section and said second ring section having a first support surface in contact with the valve cover, said first ring section and said second ring section having a radial width greater than a radial width of said front ring surface, said first ring section and said second ring section having a second support surface, said second support surface engaging said front ring surface of said support cylinder during an extraction operation, said first ring section and said second ring section axially supporting said support cylinder during said extraction operation.

2. A device in accordance with claim 1, further comprising a thrust bearing and an extraction nut, wherein said support cylinder has a cylinder section for receiving said thrust bearing, whereby to extract the nozzle assembly, said extraction device has an extraction spindle supported axially at said thrust bearing via said extraction nut, said extraction nut being screwed on an adjusting thread of said extraction spindle.

3. A device in accordance with claim 2, wherein said extraction device has an extraction spindle to stationarily engage a coupling thread of the nozzle assembly via a mounting thread arranged at an end of said extraction spindle located opposite the adjusting thread.

4. A device in accordance with claim 3, wherein said extraction spindle is provided with a hexagon which projects axially over the adjusting thread and by means of which the extraction spindle can be driven rotatingly for screwing into the coupling thread of the nozzle assembly.

5. A device in accordance with claim 1, wherein said support cylinder has a support wall, which axially adjoins a cylinder section of said support cylinder, said support wall having a free end that forms a front ring surface, said support wall having an opening, which is open toward a front ring surface and extends approximately to the cylinder section and through which extends a radially projecting connection pipe of the nozzle assembly during use.

6. A device in accordance with claim 1, wherein said extraction device has a hydraulic cylinder with a piston rod that can be coupled with the nozzle assembly and said hydraulic cylinder can be caused to engage the cylinder section of the support cylinder.

7. A device in accordance with claim 6, wherein at an end of said support cylinder, located opposite a support surface, said support cylinder has a cylinder section provided with an internal thread, by means of which said support cylinder can be screwed stationarily to a threaded pipe of said hydraulic cylinder.

8. A device in accordance with claim 6, wherein said hydraulic cylinder comprises a tubular piston cylinder with a tubular piston with a through hole, and a threaded spindle provided as a piston rod, said threaded spindle passing through said tubular piston and said threaded spindle has at one of end a mounting thread for coupling said threaded spindle with the nozzle assembly.

9. A device in accordance with claim 8, wherein at an end located opposite said mounting thread, said threaded spindle has an adjusting thread with which said threaded spindle projects over said hydraulic cylinder, and an extraction nut for axially supporting said threaded spindle on an outside at said tubular piston, said extraction nut can be screwed on the adjusting thread in an axially adjustable manner.

* * * * *